Aug. 17, 1965

J. N. COATS 3,201,152

SWIVEL PIPE JOINT

Filed April 10, 1963

INVENTOR.
JOHN N. COATS
BY
Buckhorn, Cheatham & Blore

Aug. 17, 1965

J. N. COATS 3,201,152

SWIVEL PIPE JOINT

Filed April 10, 1963

INVENTOR.
JOHN N. COATS
BY
Buckhorn, Cheatham & Blore

Aug. 17, 1965  J. N. COATS  3,201,152
SWIVEL PIPE JOINT
Filed April 10, 1963  3 Sheets-Sheet 3

JOHN N. COATS
INVENTOR.
BY
BUCKHORN, BLORE, KLARQUIST & SPARKMAN
ATTORNEYS

United States Patent Office 3,201,152
Patented Aug. 17, 1965

3,201,152
SWIVEL PIPE JOINT
John N. Coats, 2010 SW. Wembly Park Drive,
Lake Oswego, Oreg.
Filed Apr. 10, 1963, Ser. No. 272,509
4 Claims. (Cl. 285—231)

This is a continuation-in-part of application Serial No. 23,003, filed Apr. 18, 1960, and now abandoned. This invention relates to a swivel joint for coupling or connecting two conduits such as pipes, and particularly to a swivel joint adapted for handling paper stock.

Prior joints used in paper stock lines have been largely ineffective, or have been effective for only short periods of time, and then have become clogged.

It is a main object of the present invention to provide a swivel joint which can be used in paper stock lines without clogging.

A further object of the invention is to provide a thin or narrow swivel joint which has the advantages above stated.

A further object of the invention is to provide a swivel joint which is sealed to avoid leakage and yet no end play occurs because of the sealing means.

Another object is to provide a swivel joint so constructed that segmenteed washers can be used, and to provide a swivel joint constructed so that an effective seal is maintained despite misalignment of the pipes which are connected together by the joint.

Various other objects of the invention will be apparent from the following description taken in connection with the accompanying drawings wherein.

Figure 1:
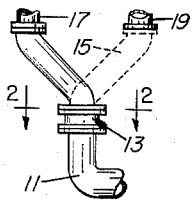
FIG. 1 is an elevational view of a pipe assembly incorporating a swivel joint of the present invention.

Referring to FIG. 1, a pipe 11 is connected by a swivel joint 13 of the present invention to a connector pipe 15 which in turn is connected to a pipe 17. When the connector pipe 15 is swung from the full line position to the dotted line position, the connector pipe 15 may be connected to the pipe 19.

Figure 2:
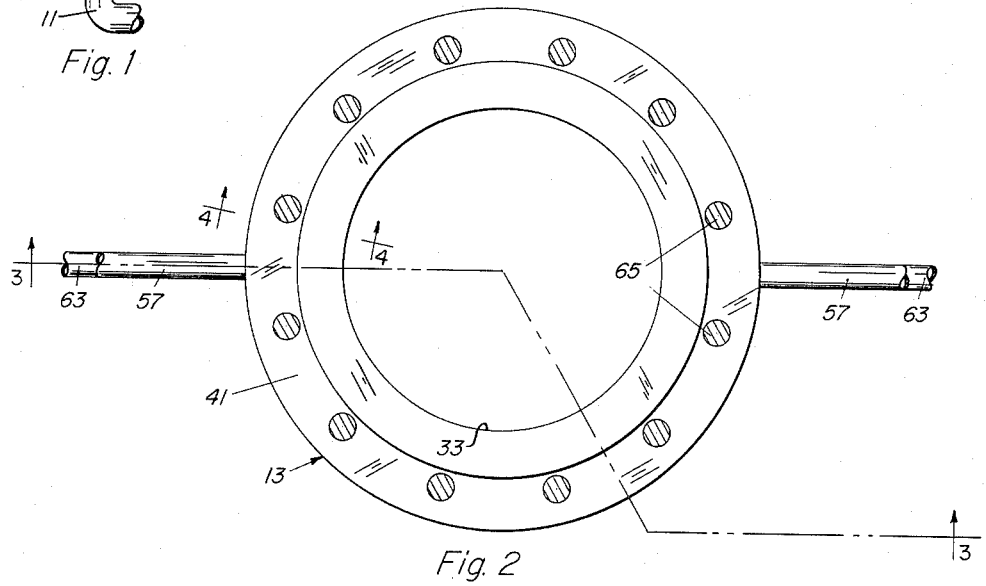
FIG. 2 is a sectional view on an enlarged scale taken along the line 2—2 of FIG. 1.
Figure 3:
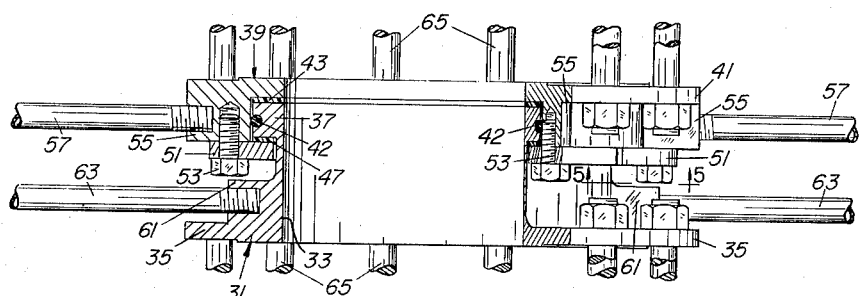
FIG. 3 is a sectional view taken along line 3—3 of FIG. 2.
Figure 4:
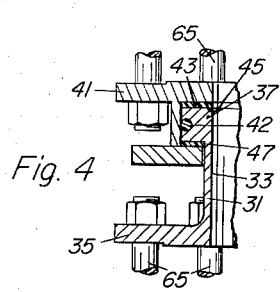
FIG. 4 is a fragmentary sectional view taken along line 4—4 of FIG. 2.

Referring to FIGS. 2, 3 and 4, the joint includes a first member in the form of a tubular element 31, the lower element as the parts are shown in FIG. 3. The tubular element 31 has a flow passage 33 of uniform diameter therethrough, and has an exterior bolting flange 35 formed at one end thereof and an exterior rib or flange 37 at its opposite end. The flanges 35 and 37 are integral portions of the element 31.

The joint includes a second member in the form of a ring generally indicated by the reference numeral 39 having an exterior bolting flange 41 at one end. The ring is counterbored at its opposite end to receive the rib or flange 37. The rib has a peripheral groove to receive an elastomer O-ring 42 which presses against the wall of the counterbore to form a fluid seal therewith.

There is a plastic washer 43 between the rib 37 and the shoulder 45. This washer has an internal diameter the same as that of the passage 33. The internal diameter of the uncounterbored position of the ring 39 is also of the same diameter so that a passage of uniform diameter throughout is provided through the swivel joint. A second plastic washer 47 is disposed below the rib 37, as the parts are shown in FIG. 3.

Figure 5:
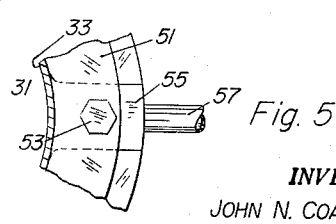
FIG. 5 is a fragmentary section taken along line 5—5 of FIG. 3.

There is a split retainer 51 comprising two semicircular portions secured by bolts 53 to bosses 55 on the ring 39, as is shown in FIGS. 3 and 5. Two of the bosses have threaded radial holes to receive handles 57. The other section 31 of the joint also has bosses 61, as shown in FIG. 3, two of which are formed with threaded radial holes to receive similar handles 63. The handles 57 and 63 facilitate turning one section of the joint relative to the other.

In mounting the swivel joint, the flanges 35 and 41 are bolted to opposed flanges of the pipes 11 and 15 by bolts 65.

*Modified form*

Figure 6:
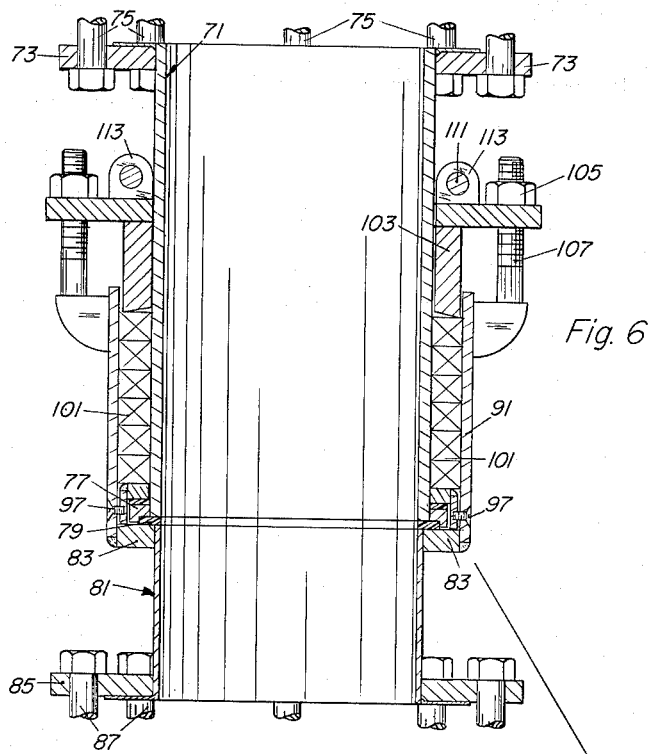
FIG. 6 is a longitudinal midsectional view through a modified form of joint.
Figure 7:
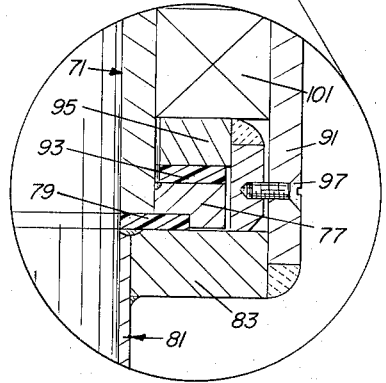
FIG. 7 is an enlarged view of a portion of the joint of FIG. 6.

FIGS. 6 and 7 show a modified form of the invention including a first tubular member 71 having an upper flange 73 secured by flange bolts 75 to a flange of a pipe. The tubular member 73 has a lower exterior flange or rib 77 rabbetted to receive a plastic washer 79. The plastic washer 79 has an internal diameter the same as that of the tubular member 71 and also the same as the flow passage through the other tubular member generally indicated by reference numeral 81. Therefore, a uniform flow passage is provided through the swivel joint.

The plastic washer 79 bears against a shoulder provided by a flange 83 on the member 81. The member 81 has a lower flange 85 as the parts are shown in FIG. 6 secured by a flange bolt 87 to the flange of an associated pipe. The tubular member 81 also has an upper tubular portion 91 permanently secured to the flange 83 and having an internal diameter greater than that of the flange or rib 77.

A plastic washer 93 is disposed above the rib or flange 77 and both the flange and the plastic washer are received with a counterbore of a spacer member 95 which fits around the tubular member 71 and within the tubular portion 91 of the lower joint member 81. A number of screws 97 secure the spacer 95 against axial movement in a direction away from the flange 83. A suitable sealing means such as a sealing material or equivalent means is provided for the screws 97 so that leakage does not occur at the location of the screws.

Between the tubular portion 91 of the member 81 and the exterior of the member 71 is packing 101 pressed against the spacer 95 by a split follower 103 which is forced downwardly as the parts are shown in FIG. 6 by nuts 105 threaded on studs 107 permanently mounted on the tubular portion 91. The split follower preferably comprises two semicircular pieces which may be connected together by bolts 111 extending through flanges 113 on the follower parts.

It is apparent from the description of both forms of the invention that the swivel joint may readily connect two pipes together, and readily permit rotation of one pipe relative to the other. It is further pointed out that because of the use of the relatively rigid plastic washers and the dimensioning of the parts, there is no space at the adjacent inner end portions of the two joint members and therefore paper stock cannot travel through any crevice or crack back into the joint to cause sticking of the joint. The plastic washers also assure good relative rotation between the metal parts and prevent seizing of the parts against one another. Furthermore, whereas effective packing has been provided in the FIG. 6 form of the invention and an effective seal in the form of an O-ring 42 has been provided in the first form of the invention, the seal and packing are so located that while they form effective seals, they do not allow end play between the parts of the joint.

Figure 8:
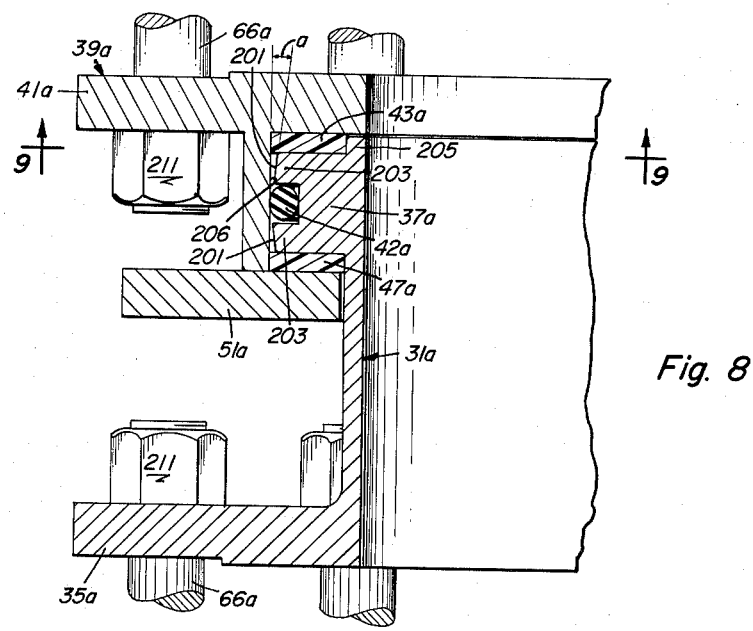
FIG. 8 is a fragmentary midsectional view through another form of the invention.
Figure 9:
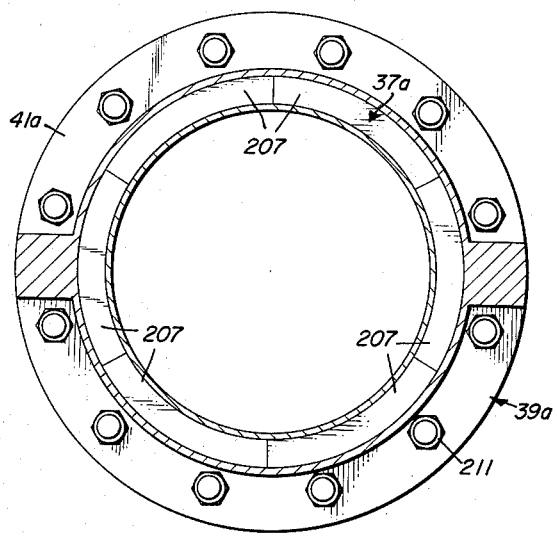
FIG. 9 is a sectional view taken along line 9—9 of FIG. 8.

FIGS. 8 and 9 show another form of the invention which is similar in many respects to the FIGS. 1–5 form. For instance the FIGS. 8 and 9 form has a first tubular member 31a, in the form of a spool, rotatably received by a second tubular member 39a, in the form of a cover ring, and retained in place by a split retainer ring 51a. A washer 43a is disposed between member 31a and member 39a, and a washer 47a is disposed between member 31a and retainer ring 51a. Member 31a carries an O-ring 42a which sealingly engages member 39a.

Member 31a differs from member 31 in two respects. The first difference concerns the peripheral surfaces 201 of the two portions 203 of the flange 37a of member 31 that provide the groove for O-ring 42a. These surfaces are relieved so that they taper inwardly in a direction away from the O-ring 42a as indicated by the angle a in FIG. 8. This relief permits some angular adjustment of members 31a and 39a as might be required to enable them to connect conduits or pipes which are not aligned, without metal-to-metal contact between the outer edges of flange 37a and the member 39a. Thus galling between flange 37a and member 39a is prohibited under the above circumstances. More importantly, where it not for the relief provided, the outer corners or edges of the flange 37a could engage the member 39a and relieve the pressure on the O-ring 42a, resulting in poor sealing action by the O-ring.

Figure 10:
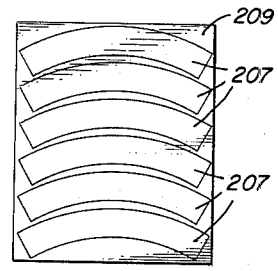
FIG. 10 shows how many washer segments can be cut from a sheet of washer stock.

The second difference between member 31a and 31 is that member 31a is provided on its inner end with an axially extending rib 205 whose inner surface is a continuation of the inner surface of the member 31a. The axial extension of the rib is substantially equal to the thickness of the washer 43a, so that while the washer engages the bottom wall of the counterbore 206, there is practically no clearance space between the rib and such wall. An important function of the rib 205 is to support the washer 43a which, instead of being a complete ring like washer 43, is formed of a plurality of arcuate segments 207 (FIG. 9). By being thus formed, a greater number of washers 43a than washers 43 can be formed from a sheet 209 of plastic washer material, as is apparent from FIG. 10.

It is pointed out that the joints of FIGS. 1–5 and 8 and 9 are compact in an axial direction despite the fact that these joints must accommodate the end portions of bolts 66 and 66a and the nuts for these bolts, which nuts are identified in FIG. 8 by the reference numeral 211. This is accomplished by providing on the cover rings 39 and 39a radially extending flange portions 41 and 41a, respectively, which have a thickness less than the depth of the associated counterbore and locating these flange portions at the outer end faces of the cover rings, thus to provide space to accommodate the nuts for the bolts which bolt the cover rings to the associated pipe flanges.

Also, the larger flanges 35 and 35a of the spools 31 and 31a are formed with a thickness approximating that of the flange portions 41 and 41a and are located at the ends of the spools remote from the cover rings to provide space to accommodate the bolt ends and nuts which secure the larger flanges 35 and 35a to the associated pipe flanges.

As is apparent from FIGS. 3 and 8, the space thus provided not only accommodates the bolt ends and nuts, but also enables the insertion and removal of the bolts 53. In fact, with my compact arrangement, the spool can have an axial dimension approximating only twice that of the cover ring.

Having described the invention in what is considered to be the preferred embodiment thereof, it is desired that it be understood that the invention is not to be limited other than by the provisions of the following claims.

I claim:
1. A swivel joint for handling liquids having solids entrained therein, such as paper stock, said joint adapted to be bolted to the opposed standard bolting flanges of a pair of relatively rotatable pipes which carry such liquid, such joint comprising, a first member in the form of an integral one-piece spool having a radial flange at each end, wherein one flange is of smaller diameter than the other, a second member in the form of a cover ring formed with a counterbore of a diameter slightly larger than that of said smaller spool flange and of a depth greater than the thickness of said smaller flange, said cover ring fitting over and enclosing said smaller spool flange, said smaller spool flange having a groove formed about its periphery intermediate the end faces of said smaller flange, an elastomer O-ring seal disposed in said groove and being of a size such that it is compressed between the bottom wall of said groove and the wall of said counterbore, a plastic thrust washer on each side of said smaller flange and engaging the adjacent end face of said smaller flange, one plastic thrust washer also engaging the bottom wall of said counterbore, split ring means engaging the other plastic thrust washer and being secured to said cover ring, the combined thickness of said thrust washers and said smaller flange being equal to the depth of said counterbore so that they fill such counterbore and prevent solids in the flowing liquid from gaining access to said elastomer O-ring seal, said cover ring having a radial flange portion projecting outwardly beyond said counterbore and being formed with a plurality of axially extending bolt holes distributed along a predetermined concentric circle, said radial flange portion having a thickness less than the depth of the counterbore and being disposed adjacent the face of said cover ring which is remote from said split ring means to provide space to accommodate nuts for the bolts receivable by said bolt holes and to accommodate the end portions of such bolts, the larger spool flange being formed with a plurality of bolt holes distributed along a concentric circle of a diameter the same as the first mentioned bolt holes, said larger spool flange being of a thickness approximating that of said radial flange portion and being disposed at the end of said spool which is remote from said covered ring to provide space to accommodate nuts for bolts receivable through the bolt holes of said larger spool flange and to accomodate the end portions of such bolts, whereby an axially compact swivel joint is provided despite the necessity of providing space to accomodate two sets of bolt end portions and two sets of nuts.

2. A swivel joint for handling liquids having solids entrained therein, such as paper stock, said joint adapted to be bolted to the opposed standard bolting flanges of a pair of relatively rotatable pipes which carry such liquid, such joint comprising, a first member in the form of an integral one-piece spool having a radial flange at each end, wherein one flange is of smaller diameter than the other, a second member in the form of a cover ring formed with a counterbore of a diameter slightly larger than that of said smaller spool flange and of a depth greater than the thickness of said smaller flange, said cover ring fitting over and enclosing said smaller spool flange, said smaller spool flange having a groove formed about its periphery intermeditae the end faces of said smaller flange, an elastomer O-ring seal disposed in said groove and being of a size such that it is compressed between the bottom wall of said groove and the wall of said counterbore, a plastic thrust washer on each side of said smaller flange and engaging the adjacent end face of said smaller flange, one plastic thrust washer also engaging the bottom wall of said counterbore, split ring means engaging the other plastic thrust washer and being secured to said cover ring, the combined thickness of said thrust washers and said smaller flange being equal to the depth of said counterbore so that they fill such counterbore and prevent solids in the flowing liquid from gaining access to said elastomer O-ring seal, said cover ring having a radial flange portion projecting outwardly beyond said counterbore and being formed with a plurality of axially extending bolt holes distributed along a predetermined concentric circle, said radial flange portion being disposed adjacent the face of said cover ring which is remote from said split ring means to provide space to accommodate nuts for the bolts receivable by said bolt holes and to accommodate the end portions of such bolts, the larger spool flange being formed with a plurality of bolt holes distributed along a concentric circle, said large spool flange being disposed at the end of said spool which is remote from said cover ring to provide space to accommodate nuts for bolts receivable through the bolt holes of said larger spool flange and to accommodate the end portions of such bolts, whereby an axially compact swivel joint is provided despite the necessity of providing space to accommodate two sets of bolt end portions and two sets of nuts.

3. A swivel joint for handling liquids having solids entrained therein, such as paper stock, said joint adapted to be bolted to the opposed standard bolting flanges of a pair of relatively rotatable pipes which carry such liquid, such joint comprising, a first member in the form of an integral one-piece spool having a radial flange at each end, wherein one flange is of smaller diameter than the other, a second member in the form of a cover ring formed with a counterbore of a diameter slightly larger than that of said smaller spool flange and of a depth greater than the thickness of said smaller flange, said cover ring fitting over and enclosing said smaller spool flange, said smaller spool flange having a groove formed about its periphery intermediate the end faces of said smaller flange, an elastomer O-ring seal disposed in said groove and being of a size such that it is compressed between the bottom wall of said groove and the wall of said counterbore, a plastic thrust washer on each side of said smaller flange and engaging the adjacent end face of said smaller flange, one plastic thrust washer also engaging the bottom wall of said counterbore, split ring means engaging the other plastic thrust washer and being secured to said cover ring, the combined thickness of said thrust washers and said smaller flange being equal to the depth of said counterbore so that they fill such counterbore and prevent solids in the flowing liquid from gaining access to said elastomer O-ring seal, said cover ring having a radial flange portion projecting outwardly beyond said counterbore and being formed with a plurality of axially extending bolt holes distributed along a predetermined concentric circle, said radial flange portion being disposed adjacent the face of said cover ring which is remote from said split ring means to provide space to accommodate nuts for the bolts receivable by said bolt holes and to accommodate the end portions of such bolts, the larger spool flange being formed with a plurality of bolt holes distributed along a concentric circle, said larger spool flange being disposed at the end of said spool which is remote from said cover ring to provide space to accommodate nuts for bolts receivable through the bolt holes of said larger spool flange and to accommodate the end portions of such bolts, whereby an axially compact swivel joint is provided despite the necessity of providing space to accommodate two sets of bolt end portions and two sets of nuts, said smaller spool flange having an axially extending rib on the outer end face thereof, said one plastic thrust washer surrounding said rib and being formed of a plurality of arcuate segments supported by said rib.

4. A swivel joint for handling liquids having solids entrained therein, such as paper stock, said joint adapted to be bolted to the opposed standard bolting flanges of a pair of relatively rotatable pipes which carry such liquid, such joint comprising, a first member in the form of an integral one-piece spool having a radial flange at each end, wherein one flange is of smaller diameter than the other, a second member in the form of a cover ring formed with a counterbore of a diameter slightly larger than that of said smaller spool flange and of a depth greater than the thickness of said smaller flange, said cover ring fitting over and enclosing said smaller spool flange, said smaller spool flange having a groove formed about its periphery intermediate the end faces of said smaller flange, an elastomer O-ring seal disposed in said groove and being of a size such that it is compressed between the bottom wall of said groove and the wall of said counterbore, a plastic thrust washer on each side of said smaller flange and engaging the adjacent end face of said smaller flange, one plastic thrust washer also engaging the bottom wall of said counterbore, split ring means engaging the other plastic thrust washer and being secured to said cover ring, the combined thickness of said thrust washers and said smaller flange being equal to the depth of said counterbore so that they fill such counterbore and prevent solids in the flowing liquid from gaining access to said elastomer O-ring seal, said cover ring having a radial flange portion projecting outwardly beyond said counterbore and being formed with a plurality of axially extending bolt holes distributed along a predetermined concentric circle, said radial flange portion being disposed adjacent the face of said cover ring which is remote from said split ring means to provide space to accommodate nuts for the bolts receivable by said bolt holes and to accommodate the end portions of such bolts, the larger spool flange being formed with a plurality of bolt holes distributed along a concentric circle, said larger spool flange being disposed at the end of said spool which is remote from said cover ring to provide space to accommodate nuts for bolts receivable through the bolt holes of said larger spool flange and to accommodate the end portions of such bolts, whereby an axially compact swivel joint is provided despite the necessity of providing space to accommodate two sets of bolt end portions and two sets of nuts, the peripheral surfaces of said smaller spool flange which flank said groove being tapered radially inwardly in a direction away from said groove to avoid metal-to-metal contact in the event said spool and cover ring are constrained to assume other than a coaxial relationship.

References Cited by the Examiner

UNITED STATES PATENTS

| | | | |
|---|---|---|---|
| 2,322,679 | 6/43 | Williamson | 285—280 X |
| 2,580,626 | 1/52 | Warren | 285—281 X |
| 2,632,659 | 3/53 | Lee | 285—281 X |
| 2,656,201 | 10/53 | Swerdlow et al. | 285—281 X |
| 2,833,566 | 5/58 | Meyer et al. | 285—280 X |

FOREIGN PATENTS 303,540　12/28　Great Britain.

CARL W. TOMLIN, *Primary Examiner.*

THOMAS F. CALLAGHAN, *Examiner.*